United States Patent [19]
Roncelli et al.

[11] Patent Number: 5,451,156
[45] Date of Patent: Sep. 19, 1995

[54] MOLDING EJECTOR DEVICE FOR INTERCHANGEABLE MOLDS

[75] Inventors: Paul E. Roncelli, deceased, late of Bloomfield Hills, by Janet M. Roncelli, Legal Representative; Duane Pickering, Madison Heights, both of Mich.

[73] Assignee: Bermar Associates, Inc., Troy, Mich.

[21] Appl. No.: 192,150

[22] Filed: Feb. 4, 1994

[51] Int. Cl.⁶ .............................................. B29C 45/40
[52] U.S. Cl. .................................. 425/192 R; 425/444; 425/556; 249/67
[58] Field of Search .................... 425/192 R, 444, 556, 425/592, 441, 576, 190, DIG. 5; 249/136, 137, 139, 163, 165, 166, 167, 67, 68; 74/55; 264/334

[56] References Cited
U.S. PATENT DOCUMENTS

| | | | |
|---|---|---|---|
| 3,706,116 | 12/1972 | Drazick | 425/451.9 |
| 3,930,778 | 1/1976 | Roncelli | 425/444 |
| 4,082,245 | 4/1978 | Santos | 425/444 |
| 4,174,939 | 11/1979 | Fenner | 425/451.9 |
| 4,516,868 | 5/1985 | Molnar | 425/87 |

*Primary Examiner*—Jay H. Woo
*Assistant Examiner*—Vi Duong Dang
*Attorney, Agent, or Firm*—Harness, Dickey & Pierce

[57] ABSTRACT

A mold assembly has an ejector assembly which includes a rotating camming device and a longitudinally sliding locking device. The ejector pins of the ejector assembly are replaced by rotating the camming device to slide the locking device into a disengaged position. The ejector pins are now free to be removed from the mold assembly. Once new ejector pins are inserted into the mold assembly the camming device is rotated back to its engaged position to lock the ejector pins into the mold assembly. The rotation of the camming device is in excess of 180° which provides a locking feature in both the engaged and disengaged positions.

23 Claims, 4 Drawing Sheets

MOLDING EJECTOR DEVICE FOR INTERCHANGEABLE MOLDS

FIELD OF THE INVENTION

The present invention relates to interchangeable molds for an injection molding apparatus. More particularly, the present invention relates to an ejector assembly for an injection mold having replaceable ejector pins and a unique apparatus for locking the ejector pins within the ejector assembly.

BACKGROUND AND SUMMARY OF THE INVENTION

Prior art injection molds include a first mold plate having a portion of a mold cavity with the first mold plate disposed within a rectangular hole in a first cavity plate. The outer surfaces of the first mold plate and the inner surface of the first cavity plate are normally flush. Both the first mold plate and the first cavity plate are secured to a first supporting plate and form one-half of a complete injection mold.

The second one-half of the prior art injection mold is similar to the first one-half in that a second mold plate has the remaining portion of the mold cavity with the second mold plate disposed within a rectangular hole in a second cavity plate. Again, the outer surface of the second mold plate and the inner surface of the second cavity plate are normally flush. Both the second mold plate and the second cavity plate are secured to a second supporting plate. The second one-half of the injection mold is usually movable with respect to the first one-half and when the second mold plate is positioned adjacent the first mold plate, the complete mold cavity is formed.

Once the first and second mold plates are brought together to form the complete mold cavity, material which is to be molded is injected into the complete mold cavity and allowed to set. The second mold plate is then withdrawn and it then becomes necessary to remove the molded article from the portion of the mold cavity located within the second mold plate. This is normally done with ejector pins which are movable in unison through holes in the second support plate. The ejector pins are grouped in a pattern dictated by the contour of the portion of the mold cavity in the first mold plate.

Each time the mold plates for a different part are inserted into an injection molding machine, a new pattern for the ejector pins is normally required in order to conform to the contour of the new mold. This means that the second support plate must be replaced or the existing second support plate must be redrilled to the new pattern of ejector pins. Because of the excessive costs involved with having a separate support plate with each mold plate, the existing second support plate is normally redrilled. After numerous drillings for new patterns of ejector pins through the second support plate, the second support plate will have so many holes that there is not enough material left to accommodate new patterns of ejector pins and the support plate must be replaced.

Further, the prior art ejector pins are normally headed pins, received in sockets in an ejector carriage plate, and are secured in the sockets of the ejector carriage plate by a retaining plate, apertured to pass the shanks of the headed pins, but not their heads. Thus, to change a pattern of prior art ejector pins, an ejector housing must be disassembler from the second support plate, so that the ejector drive may be removed. Then the retainer plate must be removed so that the then existing ejector pins may be withdrawn. The carriage plate must then be redrilled to receive the new pattern of ejector pins, and, of course, accommodations must be made for the heads of the ejector pins. Eventually, of course, the prior art carriage plate, like the prior art second support plate, must be replaced because its metal will have been drilled and machined to the point that it can no longer accommodate any further patterns of ejector pins.

U.S. Pat. No. 3,930,778, the disclosure of which is hereby incorporated herein by reference, proposes a system whereby the ejector pins necessary for a particular design can be selected from a plurality of ejector pins spaced in the second support plate according to a master template. The article to be molded is positioned in such a manner with respect to the master template that a portion of the standard set of ejector pins can be utilized to eject the molded article. The ejector pins are easily reconfigured within the mold assembly without ha, ring to disassemble the mold.

The ejector pins of the U.S. Pat. No. 3,930,778 are headless pins each of which have an end portion which is received in a socket formed in the ejector carriage plate according to the master template. Each end portion is formed with an annular groove or a slot whereby a latch member may be engaged with or disengaged from the groove or slot. The ejector pin is retained within the socket when the latch member engages the groove or slot and the ejector pin is free to be removed when the latch member is withdrawn from the groove or slot.

The second support plate for the mold plate and the mold cavity are formed with a complimentary plurality of ejector pin holes to the plurality of sockets in the ejector carriage plate all according to the master template. When a new mold plate having a different mold cavity is to be assembled onto the support plate, the old mold plate must first be removed. The latch mechanism may then be slid open to release the ejector pins which may be withdrawn through the second support plate. The mold cavity of the new mold plate will have appropriate holes for ejector pins predrilled to correspond to holes in the support plate and sockets in the ejector carriage plate. The master template is used so that the positioning of the ejector holes in the mold plate will correspond with the holes in the support plate. New ejector pins are inserted in the pattern determined by the contour of the new mold cavity and the latch member is slid back to its latching position. Thus the patter of ejector pins has been changed without the necessity of drilling new holes in the support plate nor of drilling new sockets in the ejector carrying plate. A retainer plate is removably secured to the carriage plate to retain the latch members thereon. The retainer plate is also formed with a plurality of holes which correspond to the number and distribution of the holes in the support plate, and the sockets in the carriage plate all according to the master template.

The movement of the latches between their engaged and disengaged positions in the prior art U.S. Pat. No. 3,930,778 is accomplished by exerting a load on a portion of the latch that extends beyond the edges of the ejector carriage plate. There is no means in the prior art patent for locking the latches in either position and the extended portion of the latches is susceptible to either damage or interference with other components of the molding machine.

Accordingly, what is needed is a mechanism or an apparatus which simplifies the movement of the latches between their engaged and disengaged positions. The apparatus should be simple in construction, inexpensive and resolve the problems associated with the prior art latches.

The present invention provides the art with a unique apparatus for moving the latches between their engaged and disengaged positions relative to the grooves or slots in the ejector pins. The present invention utilizes a rotating cam which mates with a slot in a corresponding latch for moving the latch between its engaged and disengaged position. The rotating eccentric cam and slot within the latch are positioned with respect to one another such that the eccentric cam travels beyond center in both directions to act as a locking device to keep the latches in their engaged or disengaged position.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
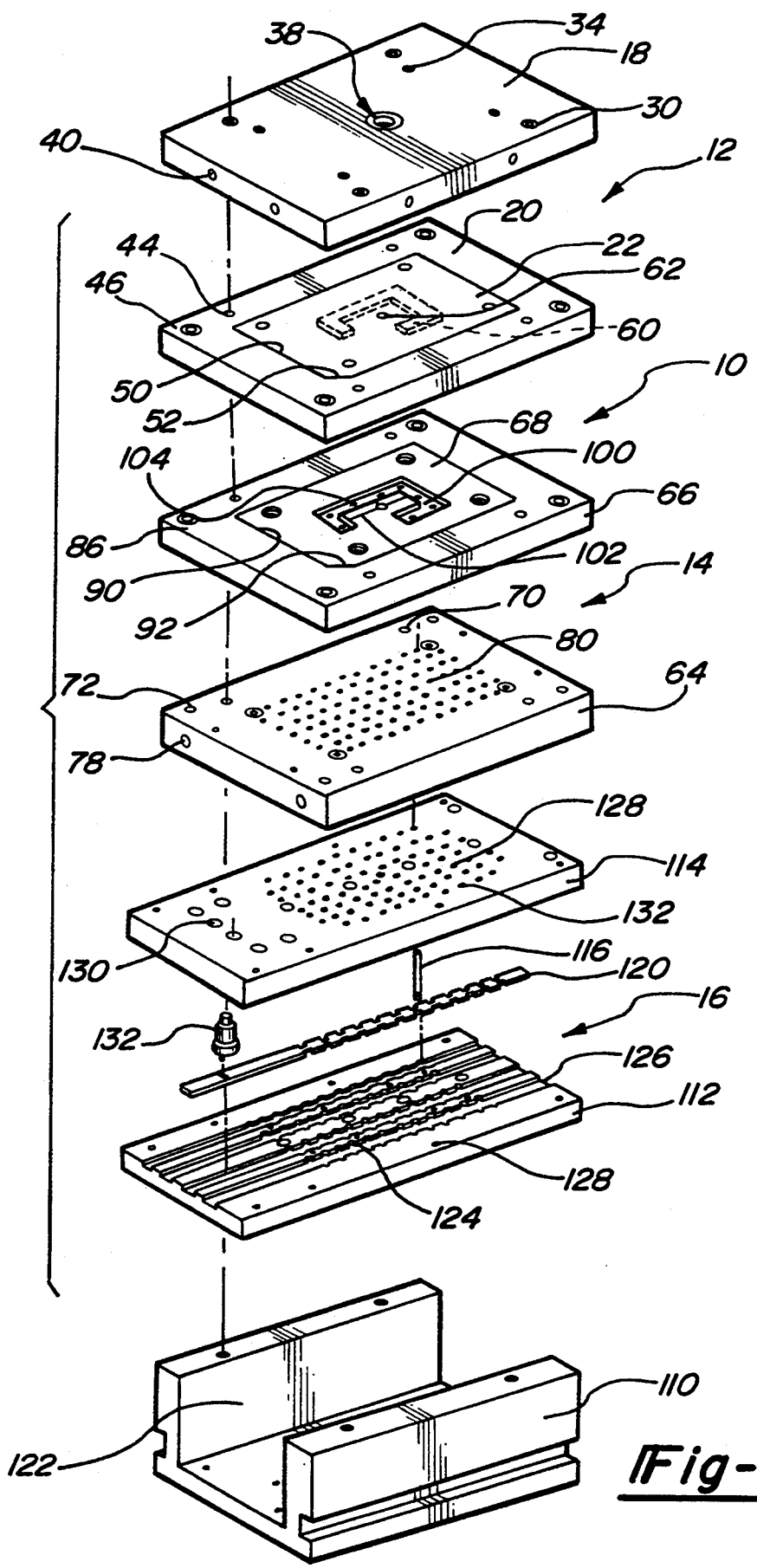
FIG. 1 is an exploded perspective view of the complete mold assembly according to the present invention.
Figure 2:
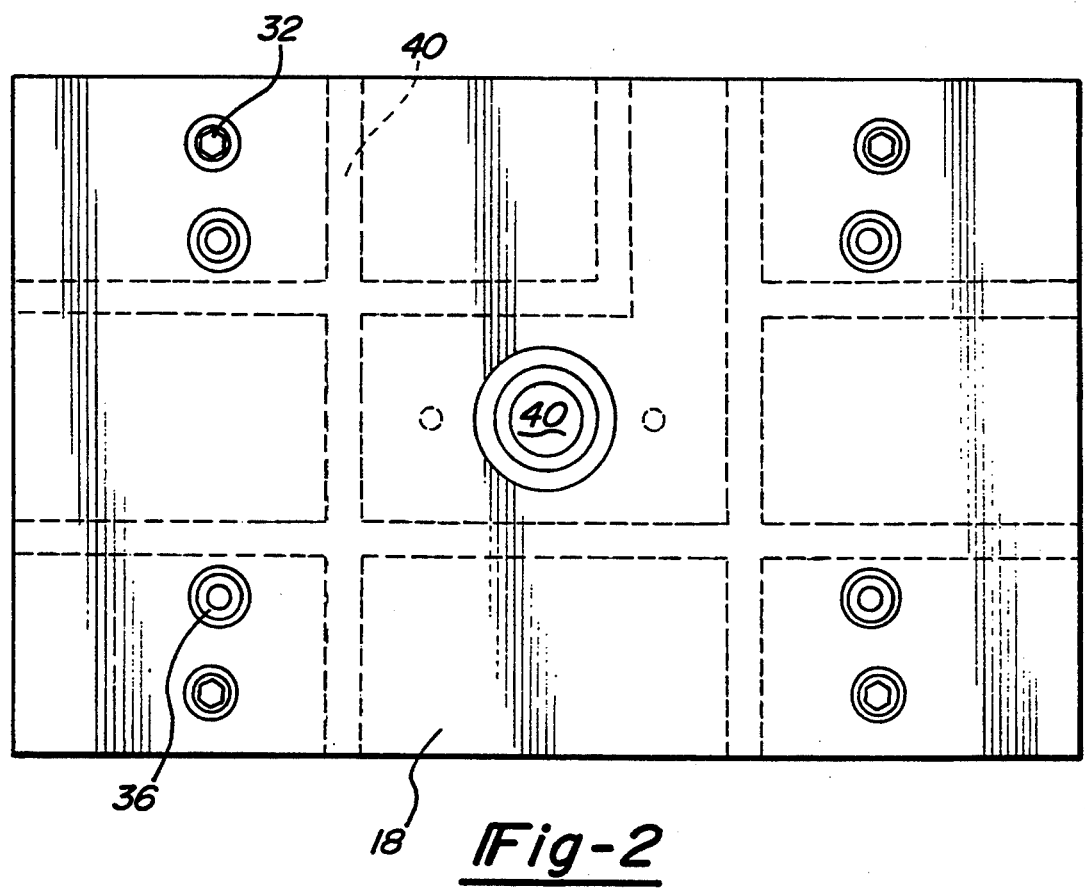
FIG. 2 is a plan view of the upper mold assembly according to the present invention shown in FIG. 1.
Figure 3:
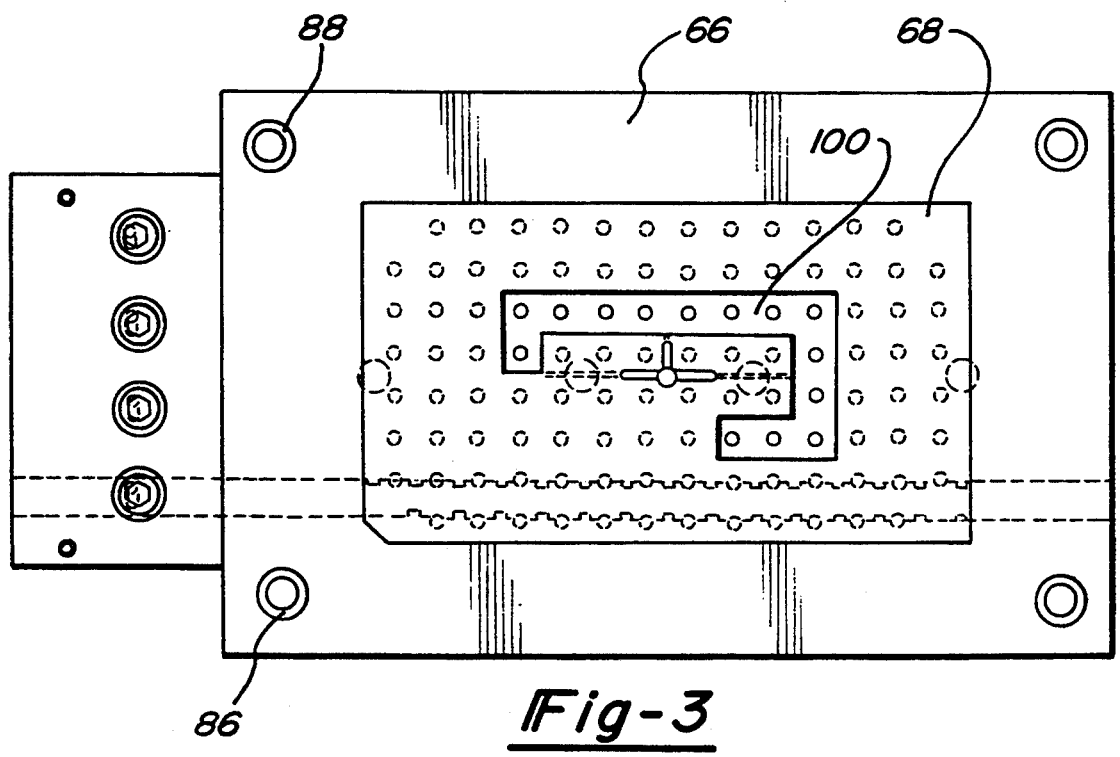
FIG. 3 is a plan view of the lower mold assembly according to the present invention shown in FIG. 1.

Referring now to the drawings in which like reference numerals designate like or corresponding parts throughout the several views, there is shown in FIGS. 1 through 5 a mold assembly incorporating the unique apparatus for moving the latches which is designated generally by the reference numeral 10. Mold assembly 10 comprises an upper mold assembly 12, a lower mold assembly 14 and an ejector assembly 16.

Upper mold assembly 12 comprises an upper or first support plate 18, an upper or first cavity plate 20 and an upper or first mold plate 22. Upper support plate 18 is a rectangular plate having a first plurality of apertures 30 with each aperture 30 adapted to receive a socket heat cap screw 32, a second plurality of apertures 34 with each aperture 34 adapted to receive a bushing 36 and a centrally located aperture 38 adapted to mate with the injection head (not shown) of a typical injection molding machine. A plurality of fluid passages 40 serve to cool upper mold plate 22 as will be described later herein.

Upper cavity plate 20 is fixedly secured to upper support plate 18 by the plurality of socket head cap screws 32 which are threadingly received in a plurality of threaded bores 44 which extend partially into upper cavity plate 20. A plurality of apertures 46 extend through upper cavity plate 20 with each aperture 46 adapted to mate with and locate a guide pin 48. Guide pins 48 aid in the proper positioning of upper and lower mold assemblies 12 and 14 during the opening and closing of mold assembly 10 as well as activation and deactivation of ejector assembly 16. A centrally located generally rectangular aperture 50 extends through upper cavity plate 20 in order to receive upper mold plate 22 as will be described later herein. It is normally advantageous to angle one corner of aperture 50 as shown at 52 in order to insure the proper orientation of upper mold plate 22.

Upper mold plate 22 is disposed within aperture 50 and is fixedly secured to upper support plate 18 by a plurality of bolts 54 which are threadingly received in a plurality of threaded bores 56 extending partially into upper support plate 18. Upper mold plate 22 includes a mold cavity 60 which forms a portion of the contour for the article being molded as well as a passageway 62 for mating with aperture 38 in upper support plate 18 for receiving the material from the injection machine for molding the article.

Lower mold assembly 14 comprises a lower or second support plate 64, a lower or second cavity plate 66 and a lower or second mold plate 68. Lower support plate 64 is a rectangular plate having a first plurality of apertures 70, each aperture 70 is adapted for the attachment of lower support plate 64 to ejector assembly 16 and lower cavity plate 66 as will be described later herein. Lower support plate 64 further includes a second plurality of apertures 72, each aperture 72 is adapted to receive an actuating pin 76 to activate and deactivate ejector assembly 16. A plurality of fluid passages 78 interconnect throughout lower support plate 64 and serve to cool lower mold plate 68 similar to fluid passages 40 interconnected throughout upper support plate 18 which serve to cool upper mold plate 22 as will be described later herein. A plurality of ejector pin apertures 80 extend through lower support plate 64 and are arranged according to a master layout.

Lower cavity plate 66 is fixedly secured to lower support plate 64 by a plurality of socket head cap screws (not shown) which extend from the bottom side of ejector assembly 16 through ejector assembly 16, through apertures 70 in lower support plate 64 and are threadingly received in a plurality of threaded bores (not shown) which extend partially into lower cavity plate 66. Thus, lower support plate 64 is sandwiched between ejector assembly 16 and lower cavity plate 66. A plurality of apertures 86 extend through lower cavity plate 66 with each aperture 86 adapted to receive a bushing 88. Bushings 88 in conjunction with guide pins 48 insure in the proper aligning of mold plates 22 and 68 during the opening and closing of mold assembly 10 and provide clearance for guide pins 48 to extend into lower cavity plate 66 to activate and deactivate ejector assembly 16 by contact actuating pins 76. A centrally located generally rectangular aperture 90 extends through lower cavity plate 66 in order to receive lower mold plate 68 as will be described later herein. Similar to upper cavity plate 20, it is normally advantageous to angle one corner of aperture 90 as shown at 92 to insure the proper orientation of lower mold plate 68.

Lower mold plate 68 is disposed within aperture 90 and is fixedly secured to lower support plate 64 by a plurality of bolts 94 which are threadingly received in a plurality of threaded bores 96 extending into lower support plate 64. Lower mold plate 68 includes a mold cavity 100 which forms the remainder of the contour for the article being manufactured as well as a plurality of sprue channels 102 for channelling the material from passageway 62 into mold cavities 60 and 100. A plurality of ejector pin apertures 104 extend through lower mold plate 68 and are operative to eject the article being molded upon opening of mold assembly 10. Mold cavities 60 and 100 are located in relationship to the master layout of ejector pin apertures such that a sufficient number and positioning of ejector pins can be assembled to eject the molded article.

Ejector assembly 16 comprises an ejector box 110, an ejector back plate 112, an ejector retaining plate 114, a plurality of ejector pins 116 and a plurality of latches or cam slide bars 120.

Ejector box 110 is a U-shaped member which is secured to lower support plate 64 by the plurality of socket head cap screws. The mating of ejection box 110 with lower support plate 64 forms a box shaped cavity 122 within which the remainder of ejector assembly 16 is disposed.

Ejector back plate 112 is disposed within cavity 122 and includes a plurality of ejector pin holes 124 extending partially into ejector back plate 112 and which are also arranged according to the master layout. The plurality of ejector pinholes 124 are aligned with the plurality of ejector pin apertures 80 which extend through lower support plate 64. Ejector back plate 112 also included a plurality of longitudinally extending guideways 126 within which cam slide bars 120 are slidingly received as will be described later herein. A plurality of apertures 128 extend through ejector back plate 112 with each aperture adapted to receive a socket head cap screw (not shown) for securing ejector retaining plate 114 to ejector back plate 112.

Ejector retaining plate 114 is fixedly secured to ejector back plate 112 by the plurality of socket head cap screws which are threadingly received into a plurality of thread bores 132 extending into ejector retaining plate 114. Ejector retaining plate 114 forms the cover for longitudinal sliding motion of cam slide bars 120 within guideways 126. Ejector plate 114 includes a plurality of ejector pin holes 128 extending through ejector retaining plate 114 and which are also arranged according to the master layout. The plurality of ejector pin holes 128 are aligned with the plurality of ejector pin apertures 80 which extend through lower plate 64. Ejector retaining plate 114 further includes a plurality of apertures 130 with each aperture being adapted to receive a cam 132. Cam 132 is comprised of a cylindrical body 134 having a threaded bore 136 extending into one end. A socket head cap screw 138 is threadingly received within bore 136 and once tightened, a roll pin 140 is assembled through cylindrical body 134 and cap screw 138 to retain cap screw 138 within bore 136. The end of cylindrical body 134 opposite to cap screw 138 is provided with a cylindrical head 142. Extending axially outward from cylindrical head 142 is an eccentric pin 144. Eccentric pin 144 is operative to longitudinally displace cam slide bars 120 within guideways 126 when an allen type wrench is inserted into cap screw 138 and torque is applied.

Cam slide bars 120 are rectangular shaped bars which are slidingly received within guideways 126. Cam slide bars 120 are provided with a plurality of notches 146 spaced so as to leave a plurality of protruding lugs 148. Ejector pin 116 is formed having an annular groove 152 or a slot 154 on one end. This end is received within one of the plurality of ejector pin holes 124. Ejector pin 116 extends through a corresponding aperture 128 in ejector retaining plate 114, through a corresponding aperture 80 within lower support plate 64 and through ejector pin apertures 104 in lower mold plate 68. Cam slide bars 120 each include an aperture 152 which extends generally perpendicular to the longitudinal axis of cam slide bar 120. Aperture 152 receives eccentric pin 144 and provides the surfaces for pin 144 to react against to cause the longitudinal movement of cam slide bar 120.

Figure 6:
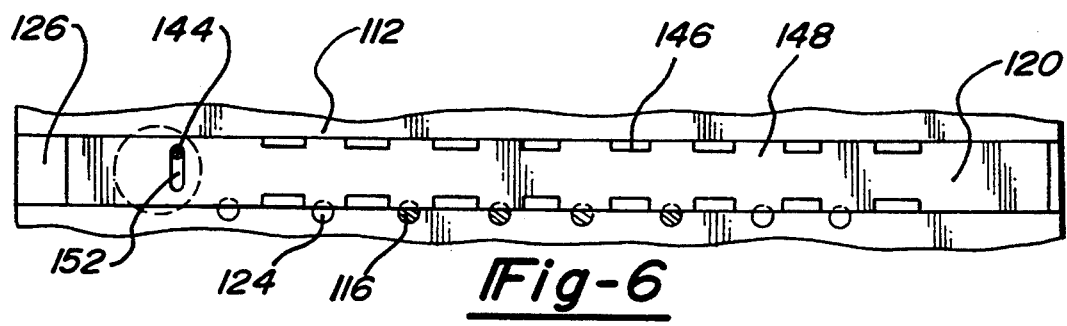
FIG. 6 is a partial horizontal sectional view taken along line 5—5 of FIG. 4 to illustrate the latch mechanism in an engaged position.
Figure 7:
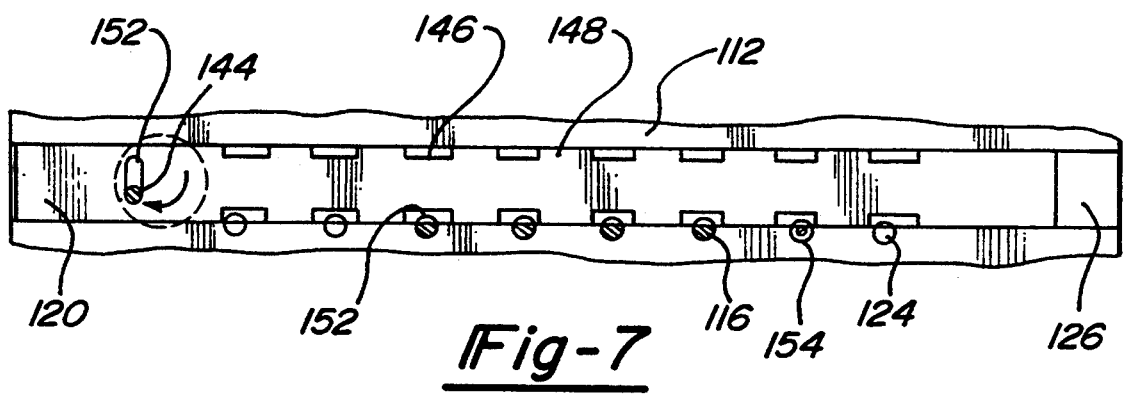
FIG. 7 is a view similar to FIG. 6 showing the latch mechanism in a disengaged position.
Figure 8:
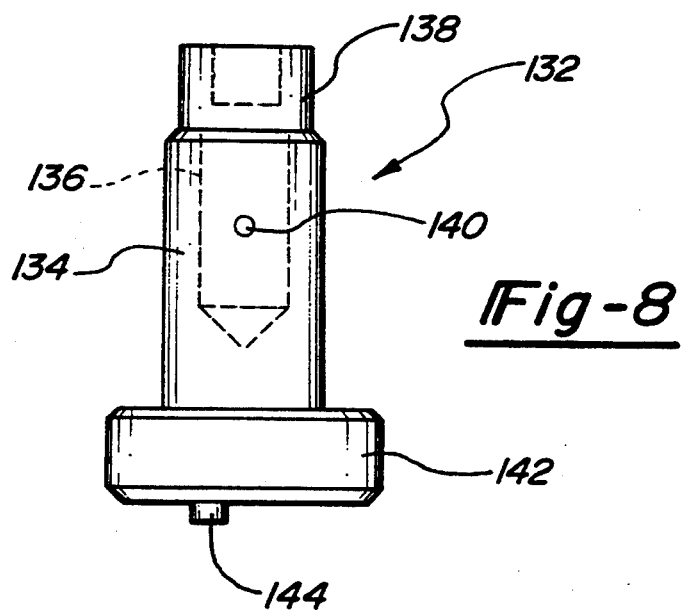
FIG. 8 is a side elevational view of the camming device of the present invention.

When cam slide bars 120 are positioned in their engaged position as shown in FIG. 6, lug 148 in slide bar 120 is located within groove 152 or slot 154 and ejector pin 116 is locked into mold assembly 10. When cam slide bars 120 are positioned in their disengaged position as shown in FIG. 7, lug 148 is moved longitudinally and notch 146 is positioned adjacent to groove 152 or slot 154 and ejector pin 116 can be removed from mold assembly 10. The movement of cam bar 120 between this engaged and disengaged position is accomplished by rotating cam 132 which rotates eccentric pin 144 which reacts against the walls of aperture 152 to longitudinally move cam bar 120. As shown in FIGS. 6 and 7, the amount of eccentricity of eccentric pin 144, the relationship of the center of rotation of cam 132 to the longitudinal axis of slide bar 120 and the length of aperture 152 are designed such that cam 132 rotates slightly in excess of 180°. This rotation greater than 180° provides an over center condition in both the engaged and disengaged positions which acts as a locking device to keep slide bar 120 in the desired location.

The changing of lower mold plate 68 thus becomes a simple operation. First lower mold plate 68 is removed from lower support plate 64. This exposes a portion of each ejector pin 116 in use. Each cam 132 is rotated with an appropriate allen wrench from its locked engaged position to its locked disengaged position. This disengages lugs 148 from grooves 152 or slots 154 of ejector pins 116. Ejector pins 116 may be easily removed from mold assembly 10. New ejector pins 116, or the same ejector pins 116, are inserted into the appropriate apertures 80 and 128 and finally into holes 124. Cam 132 is then rotated in the opposite direction such that lugs 148 now engage grooves 152 or slots 154 on the new configuration of ejector pins 116. Cam 132 is rotated in excess of 180° or over center to lock slide bar 120 into the engaged position. The new lower mold plate 68 is secured to lower support plate 64 and after switching the upper mold plate 22, mold assembly 10 is ready to begin operation.

Figure 4:
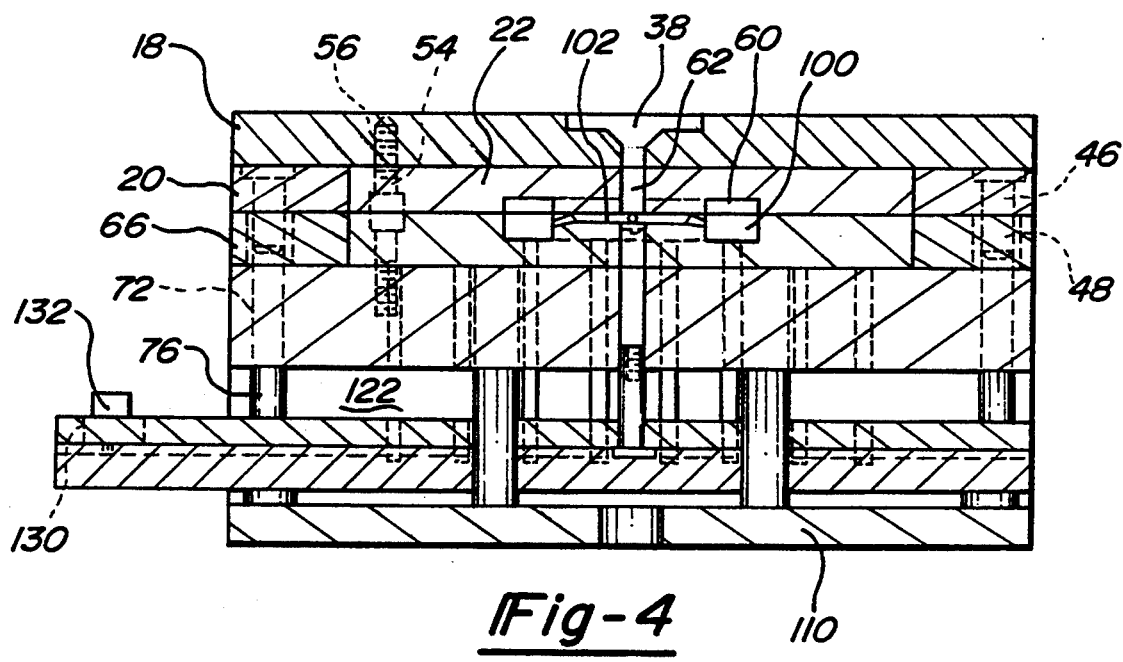
FIG. 4 is a longitudinal vertical sectional view of the complete mold assembly shown in FIG. 1 illustrated in the position for injection molding of an article and showing the ejector assembly in its retracted position.
Figure 5:
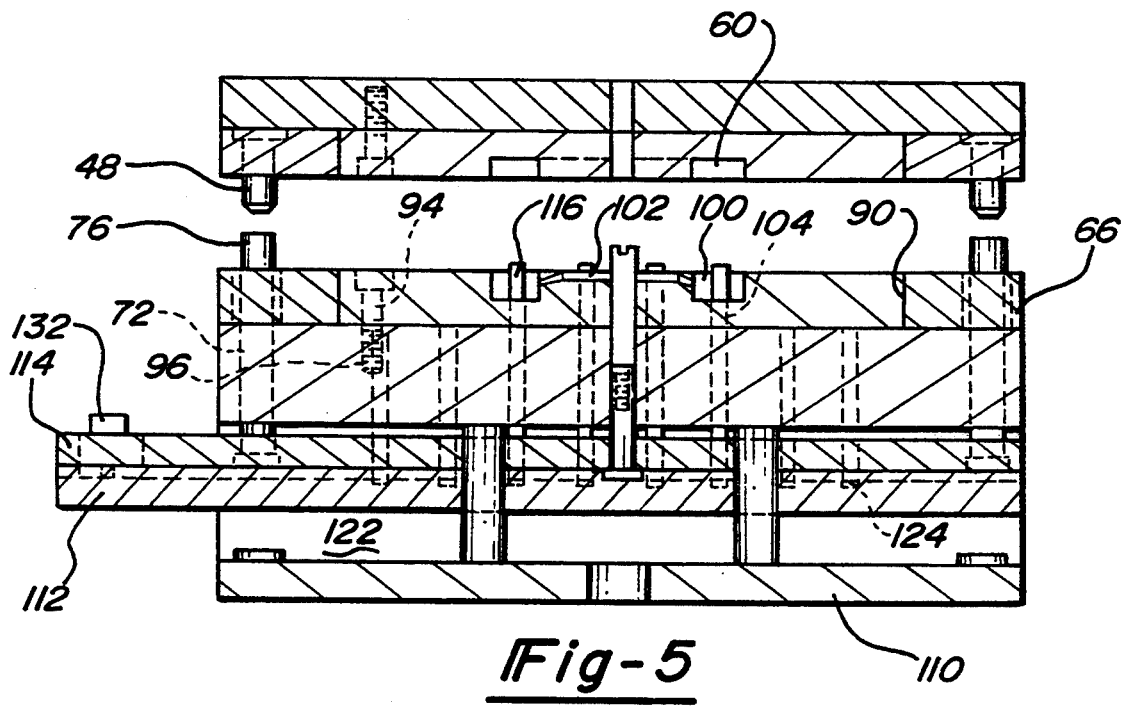
FIG. 5 is a view similar to FIG. 4 showing the second mold assembly moved with respect to the first mold assembly and showing the ejector assembly in an ejecting position.

The operation of mold assembly 10, once mold assembly 10 is assembled into an injection molding machine begins with the mold open as shown in FIG. 5. A drive system (not shown) has activated ejector assembly 16 and the previous molded part has been ejected. Mold assembly 10 is closed, as shown in FIG. 4. The closing of the mold causes guides 48 to contact actuating pins 76 and move ejector assembly 16 into its retracted or deactuated position. Molten material is injected through apertures 38, through apertures 62, through sprue channels 102 and into cavities 60 and 100 to form a molded part. After sufficient cooling time, mold assembly 10 is opened by the separation of upper mold assembly 12 from lower mold assembly 14. As mold assembly 10 is opening, the drive system activates ejector assembly 16 and the molded part is ejected by ejector pins 116. The mold is now in a position to repeat the process.

Because the molding of parts from molten material involves the cooling of the molten material, heat is transferred into mold assembly 10 including upper support plate 18, upper cavity plate 20, upper mold plate 22, lower support plate 64, lower cavity plate 66 and lower mold plate 68. Fluid passages 40 in upper support plate 18 and fluid passages 78 in lower support plate 64 allow for the circulation of fluid through plates 18 and 64 to initially bring the temperature of mold assembly 10 to an operating temperature and to keep mold assembly 10 within an operating temperature range by removing the heat transferred to mold assembly 10 by the molten material. The location of fluid passages 40 and 78 within support plates 18 and 78 respectively allows for tighter control of temperature due to the fluid being located closer to the actual mold cavities than in prior art mold assemblies.

While the above detailed description describes the preferred embodiment of the present invention, it should be understood that the present invention is susceptible to modification, variation and alteration without deviating from the scope and fair meaning of the subjoined claims.

What is claimed is:

1. A mold assembly for molding a component, said mold assembly comprising:
   a lower mold assembly;
   an upper mold assembly disposed adjacent to said lower mold assembly; and
   an ejector assembly disposed adjacent to said lower mold assembly, said ejector assembly comprising:
   an ejector plate movable with respect to said lower mold assembly between a first position and an ejection position;
   at least one headless ejector pin for ejecting said component from said mold assembly, said ejector pin being releasably mounted to said ejector plate and movable with said ejector plate between said first position and said ejection position;
   at least one cam slide bar movably secured to said ejector plate, said cam slide bar being movable with respect to said ejector plate between an engaged position to engage said ejector pin and resist its withdrawal from said ejector plate and a released position to release said ejector pin and afford its withdrawal from said ejector plate; and
   a camming member for moving said cam slide bar between said engaged position and said released position.

2. The mold assembly according to claim 1 wherein said camming member is operable to lock said cam slide bar in said engaged position.

3. The mold assembly according to claim 2 wherein said camming member is operable to lock said cam slide bar in said released position.

4. The mold assembly according to claim 1 wherein said camming member is operable to lock said cam slide bar in said released position.

5. The mold assembly according to claim 1 wherein said camming member includes an eccentric pin, said camming member being rotatably mounted with respect to said ejector plate.

6. The mold assembly according to claim 5 wherein said eccentric pin engages a slot defined by said cam slide bar.

7. The mold assembly according to claim 1 wherein said lower mold assembly includes a support plate and a cavity plate, said support plate being located between said cavity plate and said ejector plate, said support plate defining at least one hole to afford said movement of said ejector pin through said support plate, said ejector pin being removably insertable through said hole in said support plate when said cam slide bar is in said released position.

8. The mold assembly according to claim 7 wherein said support plate defines a fluid passage extending through said support plate.

9. The mold assembly according to claim 1 wherein said ejector plate comprises:
   an ejector back plate; and
   an ejector retaining plate fixedly secured to said ejector back plate, said cam slide bar being disposed between said ejector back plate and said ejector retaining plate.

10. The mold assembly according to claim 9 wherein said camming member includes an eccentric pin, said camming member being rotatably mounted within said ejector retaining plate.

11. The mold assembly according to claim 10 wherein said eccentric pin engages a slot defined by said cam slide bar.

12. A mold assembly for molding a component, said mold assembly comprising:
   an upper support plate;
   an upper mold plate fixedly secured to said upper support plate;
   a lower support plate;
   a lower mold plate adjacent to said upper mold plate, said lower mold plate fixedly secured to said lower support plate;
   an ejector box fixedly secured to said lower support plate;
   an ejector plate disposed within said ejector box, said ejector plate being movable between a first position and an ejection position;
   at least one headless ejector pin for ejecting said component from said mold assembly, said ejector pin being releasably mounted to said ejector plate and movable with said ejector plate between said first position and said ejection position;
   at least one cam slide bar movably secured to said ejector plate, said cam slide bar being movable with respect to said ejector plate between an engaged position to engage said ejector pin and resist its withdrawal from said ejector plate and a released position to release said ejector pin and afford its withdrawal from said ejector plate; and
   a camming member for moving said cam slide bar between said engaged position and said released position.

13. The mold assembly according to claim 12 wherein said camming member is operable to lock said cam slide bar in said engaged position.

14. The mold assembly according to claim 13 wherein said camming member is operable to lock said cam slide bar in said released position.

15. The mold assembly according to claim 12 wherein said camming member is operable to lock said cam slide bar in said released position.

16. The mold assembly according to claim 12 wherein said camming member includes an eccentric pin, said camming member being rotatably mounted with respect to said ejector plate.

17. The mold assembly according to claim 16 wherein said eccentric pin engages a slot defined by said cam slide bar.

18. The mold assembly according to claim 12 wherein said ejector plate comprises:
   an ejector back plate; and
   an ejector retaining plate fixedly secured to said ejector back plate, said cam slide bar being disposed between said ejector back plate and said ejector retaining plate.

19. The mold assembly according to claim 18 wherein said camming member includes an eccentric pin, said camming member being rotatably mounted within said ejector retaining plate.

20. The mold assembly according to claim 19 wherein said eccentric pin engages a slot defined by said cam slide bar.

21. The mold assembly according to claim 12 wherein said upper support plate defines a fluid passage extending through said upper support plate.

22. The mold assembly according to claim 21 wherein said lower support plate defines a fluid passage extending through said lower support plate.

23. The mold assembly according to claim 12 wherein said lower support plate defines a fluid passage extending through said lower support plate.

* * * * *